June 7, 1927.
W. B. UFFERT
1,631,843
AUTOMATIC SHAFT LOCK FOR AUTOMOBILES
Filed May 13, 1926   3 Sheets-Sheet 1
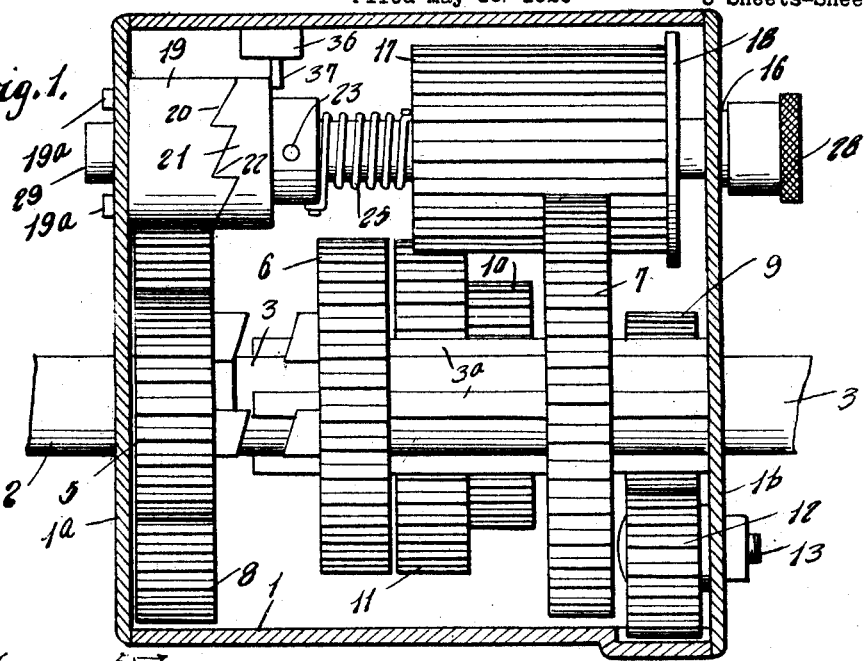
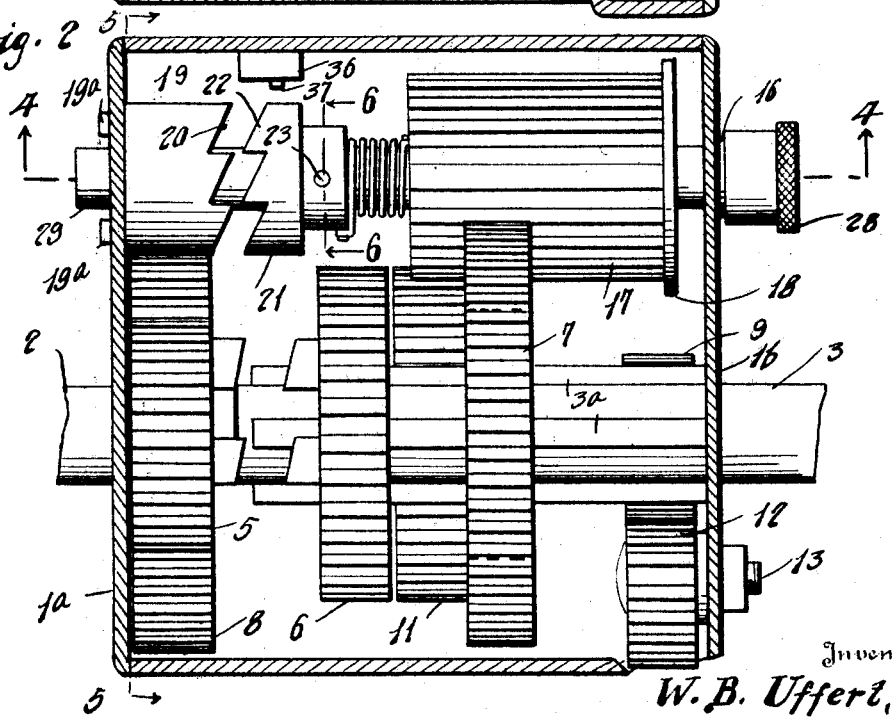
Inventor
W. B. Uffert, June 7, 1927.
W. B. UFFERT
1,631,843
AUTOMATIC SHAFT LOCK FOR AUTOMOBILES
Filed May 13, 1926
3 Sheets-Sheet 2
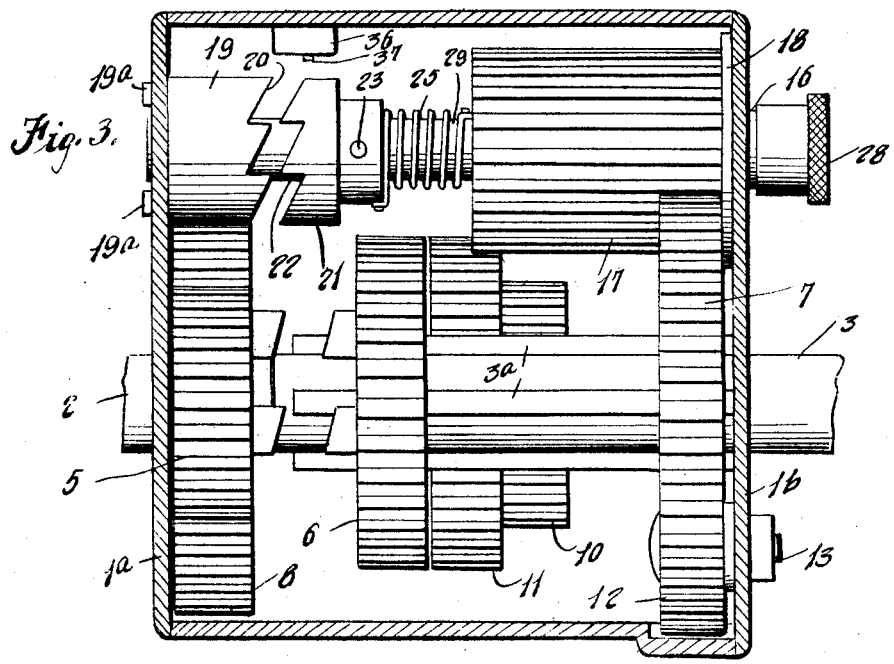
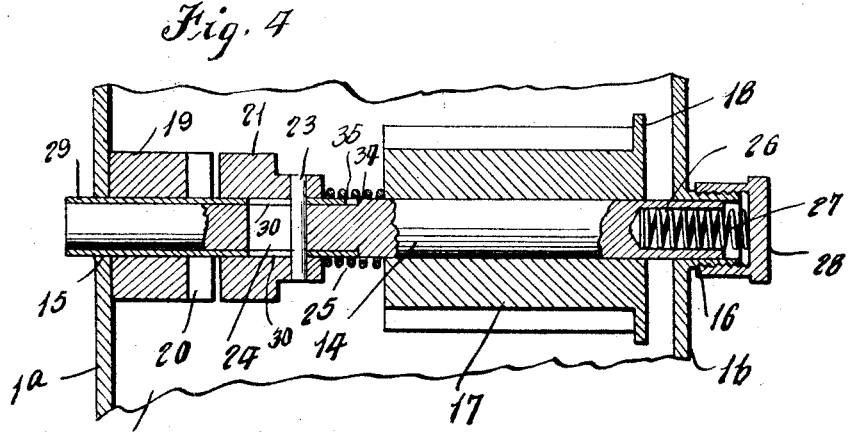
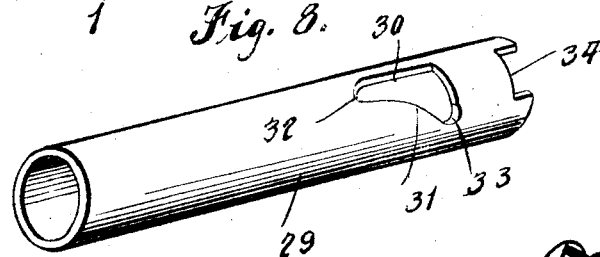
Inventor
W. B. Uffert.
By
Attorney June 7, 1927.
W. B. UFFERT
1,631,843
AUTOMATIC SHAFT LOCK FOR AUTOMOBILES
Filed May 13, 1926
3 Sheets-Sheet 3
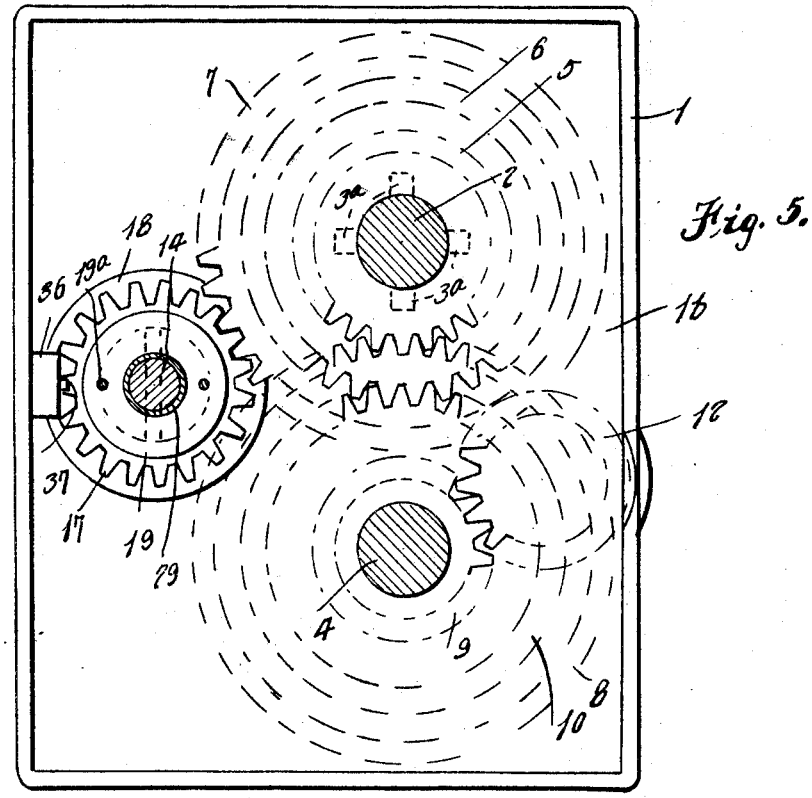
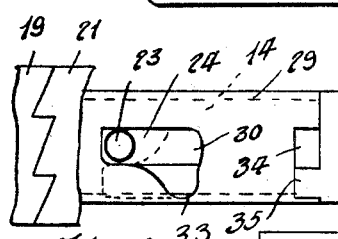
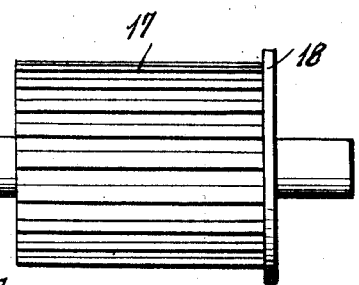
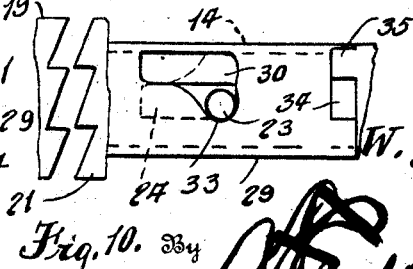

Patented June 7, 1927.

1,631,843

UNITED STATES PATENT OFFICE.

WALTER B. UFFERT, OF LYNBROOK, NEW YORK.

AUTOMATIC SHAFT LOCK FOR AUTOMOBILES.

Application filed May 13, 1926. Serial No. 108,836.

This invention relates to and has for one of its objects the provision of a novel, simple and highly efficient device which shall be adapted to hold an automobile against backward movement should it automatically stop or be manually stopped while ascending a hill.

A further object of the invention is the provision of a device of the character stated which shall be adapted to automatically come into play the instant the automobile automatically stops or is manually stopped A further object of the invention is the provision of a device of the character stated which shall be adapted to perform its function by securing or locking the propeller shaft of the automobile against backward rotation when the automobile automatically stops or is manually stopped, and which will not interfere with the starting or reversing of the automobile.

A further object of the invention is the provision of a device of the character stated which shall be adapted to be connected to the propeller shaft through the medium of the transmission gearing of the automobile.

A still further object of the invention is the provision of a device of the character stated which can also be employed for the purpose of preventing theft of the automobile when parked.

With the foregoing and other objects in view, the invention consists of the novel construction, combination and arrangement of parts hereinafter fully described and claimed, and illustrated in the accompanying drawings, wherein:

Figure 1 is a top plan view of an automobile transmission gearing equipped with the device, the gears of the former being shown in neutral position and the device in active or automobile holding or locking position, Figure 2 is a similar view with the gears in a forward driving position and the device in inactive position, Figure 3 is also a similar view with the gears in reverse driving position and the device in inactive position, Figure 4 is a sectional view taken on the vertical plane indicated by the line 4—4 of Figure 2, Figure 5 is a sectional view taken on the vertical plane indicated by the line 5—5 of Figure 2, Figure 6 is a sectional view taken on the vertical plane indicated by the line 6—6 of Figure 2, Figure 7 is a detail view in side elevation of the shaft and gear of the device, Figure 8 is a detail perspective view of the locking sleeve of the device, Figure 9 is a detail view illustrating the position of the locking sleeve when the ratchets are in engagement, and Figure 10 is a detail view illustrating the manner in which the locking sleeve is adapted to hold the rotating ratchet out of contact with the stationary ratchet when the automobile is in forward motion.

Corresponding and like parts are referred to in the following description, and designated in the several views of the accompanying drawings, by similar reference characters.

In the drawings, 1 designates the casing, 2 the clutch shaft, 3 the sliding gear shaft and 4 the counter shaft of transmission gearing for automobiles. The shaft 3 is connected to the propeller shaft of the automobile by a universal joint, not shown. A high speed and clutch gear 5 is carried by the clutch shaft 2. An intermediate speed and clutch gear 6 and a low speed and reverse gear 7 are slidably connected to the shaft 3 by ribs 3ᵃ. The counter shaft 4 carries a drive gear 8, a reverse pinion 9, a low speed pinion 10 and an intermediate speed pinion 11. A reverse idle gear 12 meshing with the pinion 9, is journaled on a stub shaft 13 carried by the casing 1. During the forward propulsion of the automobile, the shaft 3 and the low speed and reverse gear 7 rotate in a clockwise direction when viewed from the front, while during the rearward or reverse propulsion of the automobile, these parts rotate in the reverse or counter-clockwise direction. As the transmission gearing is of well known construction a further description thereof is deemed unnecessary.

The device forming the subject-matter of this invention comprises a shaft 14 and is journaled in bearings 15 and 16 provided in the front wall 1ᵃ and rear wall 1ᵇ, respectively, of the casing 1. The shaft 14 is supported by the bearings 15 and 16 for rotary and for forward and rearward endwise movements. A drum gear 17 mounted on and fixed to the shaft 14, meshes with the low speed and reverse gear 7 and is provided at its rear end with an annular flange 18. A stationary ratchet 19 is located within the casing 1 and is fixed to the front wall 1ª thereof by screws 19ª. It surrounds the shaft 14 and is provided at its rear side with an annular series of teeth 20 which face in a counter-clockwise direction when viewed from the front. A rotating ratchet 21 is carried by the shaft 14 and is provided at its front end with an annular series of teeth 22 which face in a clockwise direction when viewed from the front. The ratchet 21 is secured to the shaft 14 for rotation therewith and for movement in the direction of the length thereof by means of a pin 23 which is engaged with the ratchet and passes through a slot 24 in the shaft. A spiral spring 25 mounted upon the shaft 14 between the gear 17 and ratchet 21 normally holds the latter in engagement with the ratchet 19. The rear end portion of the shaft 14 is provided with a recess 26 for the reception of a spiral spring 27 which normally holds the shaft 14 in its forward position, the spring bearing against the bottom wall of the recess and a cap 28 removably applied to the bearing 16. A sleeve 29 is mounted upon the shaft 14 and passes through the bearing 15 and ratchets 19 and 21. It is provided with openings 30 through which the pin 23 passes and which are substantially triangular in contour. The walls 31 of the openings 30 are of arcuate formation, and the openings present seats 32 for the reception of the pin 23 when the ratchet 21 is in engagement with the ratchet 19, and seats 33 for the reception of the pin when the ratchet 21 is out of engagement with the ratchet 19. The sleeve 29 is provided in its rear end with a notch 34 which receives a lug 35 carried by the shaft 14. The circumferential dimension of the notch 34 is greater than the corresponding dimension of the lug 35 so as to permit the sleeve 29 to have a slight rotary motion with respect to the shaft 14.

When the automobile is at rest and during any forward speed thereof, the spring 27 yieldingly maintains the shaft 14 and drum 17 in the positions in which they are shown in Figures 1, 2 and 4. The low speed and reverse gear 7 is always in mesh with the gear 17 and moves with respect to the gear 17 while it is being engaged with or disengaged from the low speed pinion 10. When the automobile is at rest, the ratchet 21 engages the ratchet 19 and is held in engagement therewith by the spring 25. When the ratchets 19 and 21 are in engagement, the pin 23 is located in the front end of the slot 24 and the recesses 32 of the sleeve 29. The ratchets 19 and 21 will when in engagement hold the propeller shaft of the automobile against casual counter-clockwise rotation, and the propeller shaft will in turn hold the rear wheels of the automobile against casual rearward rotation, with the result that should the automobile automatically stop or be manually stopped while ascending a hill it will be automatically locked against casual backward movement. During the starting of the automobile, the ratchet 21 is driven in a counter-clockwise direction with the result that it will automatically recede from the ratchet 19 against the tension of the spring 25. During the consequent rearward movement of the pin 23 with respect to the shaft 14, the sleeve 29 will be turned with respect to the shaft 14 far enough to position the recesses 33 for the reception of the pin 23, the sleeve 29 now being in a position to hold the ratchet 21 against forward movement on the shaft 14 into engagement with the ratchet 19. Should the automobile automatically stop or be manually stopped, the ratchet 21 will be moved forwardly by the spring 25 into engagement with the ratchet 19 so as to lock the propeller shaft against counter-clockwise rotation. When the low speed and reverse gear 7 is moved into engagement with the reverse idle gear 12, the gear 7 shoulders against the flange 18 and carries the shaft 14 rearwardly against the tension of the spring 27. This carries the ratchet 21 out of engagement with the ratchet 19 whereby to free the propeller shaft for rotation in counter-clockwise direction. The movement of the low speed and reverse gear 7 into neutral position or into engagement with the low speed pinion 10 permits the spring 27 to return the shaft 14 and associated parts to and hold them in normal position.

A lock 36 of any well known or appropriate construction is carried by the casing 1 in a position to permit it to be readily operated from the driver's seat and to permit its bolt 37 to be projected into contact with the rear side of the ratchet 21 when such ratchet is in engagement with the ratchet 19. When the lock bolt 37 is in contact with the ratchet 21, the propeller shaft of the automobile is held against rotation in both directions, with the result that the automobile cannot be stolen when parked.

From the foregoing description, taken in connection with the accompanying drawings, the advantages of the construction and of the method of operation will be readily apparent to those skilled in the art to which the invention appertains. While I have described the principle of operation of the invention, together with the device which I now consider to be the best embodiment thereof, I desire to have it understood that the device shown is merely illustrative, and that such changes may be made when desired as are within the scope of the invention as claimed.

What is claimed is:—

1. In combination with the transmission gearing of a vehicle, a stationary ratchet, a shaft, a ratchet carried by the shaft for cooperation with the stationary ratchet, and a gear carried by the shaft and constantly in mesh with one of the gears of the transmission.

2. In combination with the transmission gearing of a vehicle, a stationary ratchet, a shaft, a ratchet carried by the shaft for cooperation with the stationary ratchet, and a gear carried by the shaft and constantly in mesh with the low speed and reverse sliding gear of the transmission.

3. In combination with the transmission gearing of a vehicle, a stationary ratchet, a shaft supported for rotary and endwise movement, a spring exerting endwise pressure on the shaft, a ratchet carried by the shaft for cooperation with the stationary ratchet, and a gear carried by the shaft and meshing with one of the gears of the transmission.

4. In combination with the transmission gearing of an automobile, a stationary ratchet, a shaft, a ratchet carried by the shaft for rotation therewith and endwise movement with respect thereto and adapted to cooperate with the stationary ratchet, a spring bearing against the ratchet carried by the shaft, a gear carried by the shaft and meshing with one of the gears of the transmission, and means adapted to hold the ratchet carried by the shaft out of engagement with the stationary ratchet during the rotation of the shaft.

5. In combination with the transmission gearing of a vehicle, a stationary ratchet, a shaft supported for rotary and endwise movements, a spring exerting an endwise pressure on the shaft, a ratchet carried by the shaft for cooperation with the first named ratchet, and a flanged gear carried by the shaft and meshing with the low speed and reverse sliding gear of the transmission.

6. In combination with the transmission gearing of a vehicle, a stationary ratchet, a rotatable ratchet, means yieldingly holding the rotatable ratchet in engagement with the stationary ratchet, and a gear connected to the rotatable ratchet and constantly in mesh with one of the gears of the transmission.

7. In combination with the transmission gearing of a vehicle, a stationary ratchet, a rotatable ratchet, means supporting the rotatable ratchet for endwise movement with respect to the stationary ratchet and yieldingly holding it in engagement with the stationary ratchet, and a flanged gear connected to the rotatable ratchet and constantly in mesh with one of the gears of the transmission.

8. In combination with the transmission gearing of a vehicle, a stationary ratchet, a rotatable ratchet, means supporting the rotatable ratchet for endwise movement with respect to the stationary ratchet and yieldingly holding it in engagement with the stationary ratchet, a gear connected to the rotatable ratchet and constantly in mesh with one of the gears of the transmission, and means adapted to hold the rotatable ratchet out of engagement with the stationary ratchet while said rotatable ratchet is in motion.

In testimony whereof I affix my signature.

WALTER B. UFFERT.